United States Patent
Bean et al.

(10) Patent No.: US 11,288,047 B2
(45) Date of Patent: *Mar. 29, 2022

(54) HETEROGENOUS COMPUTER SYSTEM OPTIMIZATION

(71) Applicant: International Business Machines Corporation, Armonk, NY (US)

(72) Inventors: Chris R. Bean, Chandler's Ford (GB); Kevin C. Brown, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,991

(22) Filed: Jan. 16, 2020

(65) Prior Publication Data

US 2020/0150941 A1 May 14, 2020

Related U.S. Application Data

(63) Continuation of application No. 15/046,544, filed on Feb. 18, 2016, now Pat. No. 10,579,350.

(51) Int. Cl.
*G06F 8/41* (2018.01)
*G06F 9/48* (2006.01)
*G06F 9/50* (2006.01)

(52) U.S. Cl.
CPC .......... *G06F 8/4441* (2013.01); *G06F 9/4881* (2013.01); *G06F 9/5027* (2013.01)

(58) Field of Classification Search
CPC ..... G06F 8/4441; G06F 8/4881; G06F 9/5027
See application file for complete search history.

(56) References Cited

U.S. PATENT DOCUMENTS 6,895,577 B1 5/2005 Noble et al.
8,830,245 B2 9/2014 Bone et al.
(Continued)

FOREIGN PATENT DOCUMENTS

CN 101706741 A 5/2010
EP 14162520 3/2014
KR 10-2013-0108609 A 10/2013

OTHER PUBLICATIONS

EP14162520.2, Bart Goossens, Program Execution on Heterogeneous Platform (Year: 2014).*
(Continued)

*Primary Examiner* — Duy Khuong T Nguyen
(74) *Attorney, Agent, or Firm* — Heslin Rothenberg Farley & Mesiti P.C.; Nick Cadmus, Esq.

(57) ABSTRACT

Method and system are provided for identifying a processing element for executing a computer program code module. The method includes: calculating a cyclomatic complexity score for the module; selecting one of a first or second processing element based on the calculated complexity score, the first processing element having a first architecture and the second processing element having a second architecture different from the first architecture, the first and second processing elements forming part of a heterogeneous computer system; running the module on the selected processing element to determine a first run time, and subsequently running the module on the non-selected processing element to determine a second run time; comparing the first and second run time to identify a shortest run time; and identifying a processing element producing a shortest run time as the processing element for executing the computer program code module.

13 Claims, 4 Drawing Sheets

(56) References Cited

U.S. PATENT DOCUMENTS

| | | | |
|---|---|---|---|
| 8,887,160 B2* | 11/2014 | Lehavi | G06F 9/5027 |
| | | | 718/100 |
| 9,038,088 B2 | 5/2015 | Phull et al. | |
| 10,162,671 B2* | 12/2018 | Kim | G06F 11/3419 |
| 2002/0097253 A1* | 7/2002 | Charisius | G06F 8/34 |
| | | | 715/700 |
| 2005/0223361 A1 | 10/2005 | Belbute | |
| 2007/0168914 A1 | 7/2007 | Reddy | |
| 2007/0220486 A1* | 9/2007 | Lammel | G06F 8/10 |
| | | | 717/114 |
| 2008/0077928 A1 | 3/2008 | Matsuzaki et al. | |
| 2008/0320457 A1* | 12/2008 | King | G06F 11/3616 |
| | | | 717/146 |
| 2009/0144698 A1* | 6/2009 | Fanning | G06F 11/3676 |
| | | | 717/120 |
| 2011/0067009 A1 | 3/2011 | Hosokawa et al. | |
| 2011/0067016 A1 | 3/2011 | Mizrachi et al. | |
| 2012/0149646 A1* | 6/2012 | Marshall | A61K 47/645 |
| | | | 514/17.8 |
| 2012/0192200 A1 | 7/2012 | Rao et al. | |
| 2013/0074077 A1 | 3/2013 | Miller et al. | |
| 2013/0160016 A1* | 6/2013 | Gummaraju | G06F 9/5044 |
| | | | 718/102 |
| 2013/0167130 A1* | 6/2013 | Alvanos | G06F 8/4442 |
| | | | 717/160 |
| 2013/0254746 A1* | 9/2013 | Balakrishnan | G06F 11/3684 |
| | | | 717/124 |
| 2013/0311968 A1* | 11/2013 | Sharma | G06F 11/3692 |
| | | | 717/101 |
| 2014/0040880 A1 | 2/2014 | Brownlow et al. | |
| 2014/0130056 A1* | 5/2014 | Goodman | G06F 9/4881 |
| | | | 718/104 |
| 2014/0337313 A1* | 11/2014 | Becerra | G06F 16/24537 |
| | | | 707/713 |
| 2016/0054932 A1* | 2/2016 | Wang | G06F 13/1668 |
| | | | 711/151 |
| 2016/0119209 A1* | 4/2016 | Rosengarten | H04L 67/1008 |
| | | | 709/224 |
| 2017/0031800 A1* | 2/2017 | Shani | G06F 11/3604 |
| 2017/0046307 A1* | 2/2017 | Lvov | G06T 1/20 |
| 2017/0109210 A1 | 4/2017 | Goosens | |
| 2017/0242672 A1 | 8/2017 | Bean et al. | |

OTHER PUBLICATIONS

Dollinger et al., "CPU + GPU Load Balance Guided by Execution Time Prediction", 5th International Workshop on Polyhedral Compilation Techniques, IMPACT 2015 (Jan. 19, 2015) (9 pages).

Che et al., Reduction Transformations for Optimization Parameter Selection, 2005, 8 pages.

Tahir Diop, Regression Modelling of Power Consumption for Heterogeneous Processors, 2013.

Unachak et al., Adaptive Representation for Flexible Job-Shop Scheduling and Rescheduling, 2009 (Year: 2009).

List of IBM Patents or Patent Applications Treated as Related, Jan. 31, 2020, 2 pages.

* cited by examiner

HETEROGENOUS COMPUTER SYSTEM OPTIMIZATION

BACKGROUND

The present invention relates generally to facilitating efficient use of the heterogeneous resources of a heterogeneous computer system.

Today, many computer systems are heterogeneous computer systems in the sense that the computer systems might comprise multiple processing elements that have different architectures, such as different hardware architectures. The different architectures are typically chosen to optimize the design of the processing element for a particular subset of tasks in order to reduce the throughput times of such tasks performed by the computer system. One example of a heterogeneous computer system may include a central processing unit (CPU) and a graphics processing unit (GPU), although other types of heterogeneous computer systems are also known.

In order to optimize the performance of a heterogeneous computer system, it is desirable to ensure that during operation of the computer system, the resources of the computer system are effectively utilized. For example, different types of computer program code may be most effectively executed, e.g. in terms of throughput times, on different types of processing elements, i.e. processing elements having different architectures. For example, computer program code that can be executed with a high degree of parallelism while requiring regular I/O, e.g. memory read/write operations during execution is typically ideally suited for execution on a GPU, whereas computer program code requiring cache exploitation and/or exhibiting many conditional expressions such as branch instructions may be better suited for execution on a CPU, as large parts of the GPU architecture cannot be sufficiently utilized or not utilized at all when executing such a computer program code.

It is therefore desirable to provide some strategy for deciding which processing element of the heterogeneous computer system will be responsible for executing a particular computer program code module, e.g. a software module, to ensure (near-)optimal performance of the computer system.

Jean-Francois Dollinger et al. in "CPU+GPU Load Balance Guided by Execution Time Prediction" as published in the Proceedings of the Fifth International Workshop on Polyhedral Compilation Techniques (IMPACT 2015), disclose a method to jointly use the CPU and GPU to execute a balanced parallel code automatically generated using polyhedral tools. To evenly distribute the load, the system is guided by predictions of loop nest execution times. This approach seeks to optimize the utilization of the CPU and GPU as a function of throughput time. However, such an approach is not guaranteed to minimize throughput time of a particular module of computer program code due to the fact that at least part of the code may be executed on a processing element having inferior throughput characteristics for that particular code. Moreover, the success of the method is heavily reliant on the accuracy of the predictions of the loop nest execution times, which predictions may not always be accurate, which is likely to negatively affect the throughput times of the computer program code module executed on such a heterogeneous hardware architecture.

SUMMARY

In accordance with one or more aspects, a computer-implemented method is provided for identifying a processing element for executing a computer program code module. The computer-implemented method includes: calculating a cyclomatic complexity score for the computer program code module; selecting one of a first processing element or a second processing element based on the calculated cyclomatic complexity score, the first processing element having a first architecture and the second processing element having a second architecture different from the first architecture, the first processing element and the second processing element forming part of a heterogeneous computer system; running the computer program code module on the selected processing element to determine a first runtime of the computer program code module; subsequently running the computer program code module on the other, non-selected processing element to determine a second runtime of the computer program code module; comparing the first runtime and the second runtime to identify a shortest runtime; and identifying the processing element producing the shortest runtime as the processing element for executing the computer program code module.

In one or more other aspects, a computer program product is provided for identifying a processing element for executing a computer program code module. The computer program product includes a computer-readable storage medium having program instructions embodied therewith, the program instructions being executable by a processor to cause the processor to perform a method comprising: calculating a cyclomatic complexity score for a computer program code module; selecting one of a first processing element or a second processing element based on the calculated cyclomatic complexity score, the first processing element having a first architecture and the second processing element having a second architecture different from the first architecture, the first processing element and the second processing element forming part of a heterogeneous computer system; running the computer program code module on the selected processing element to determine a first runtime of the computer program code module; subsequently running the computer program code module on the other, non-selected processing element to determine a second runtime of the computer program code module; comparing the first runtime and the second runtime to identify a shortest runtime; and identifying the processing element producing the shortest runtime as the processing element for executing the computer program code module.

In one or more further aspects, a system is provided for identifying a processing element for executing a computer program code module. The system includes a memory, and a processor communicatively coupled to the memory. The system performs a method comprising: calculating a cyclomatic complexity score for the computer program code module; selecting one of a first processing element or a second processing element based on the calculated cyclomatic complexity score, the processing element having a first architecture and the second processing element having a second architecture different from the first architecture, the first processing element and the second processing element forming part of a heterogeneous computer system; running the computer program code module on the selected processing element to determine a first runtime of the computer program code module; subsequently running the computer program code module on the other, non-selected processing element to determine a second runtime of the computer program code module; comparing the first runtime and the second runtime to identify a shortest runtime; and identifying the processing element producing the shortest runtime as the processing element for executing the computer program code module.

BRIEF DESCRIPTION OF THE DRAWINGS

One or more embodiments of the present invention are described below, by way of example only, with reference to the drawings, in which.

DETAILED DESCRIPTION

Figure 1:
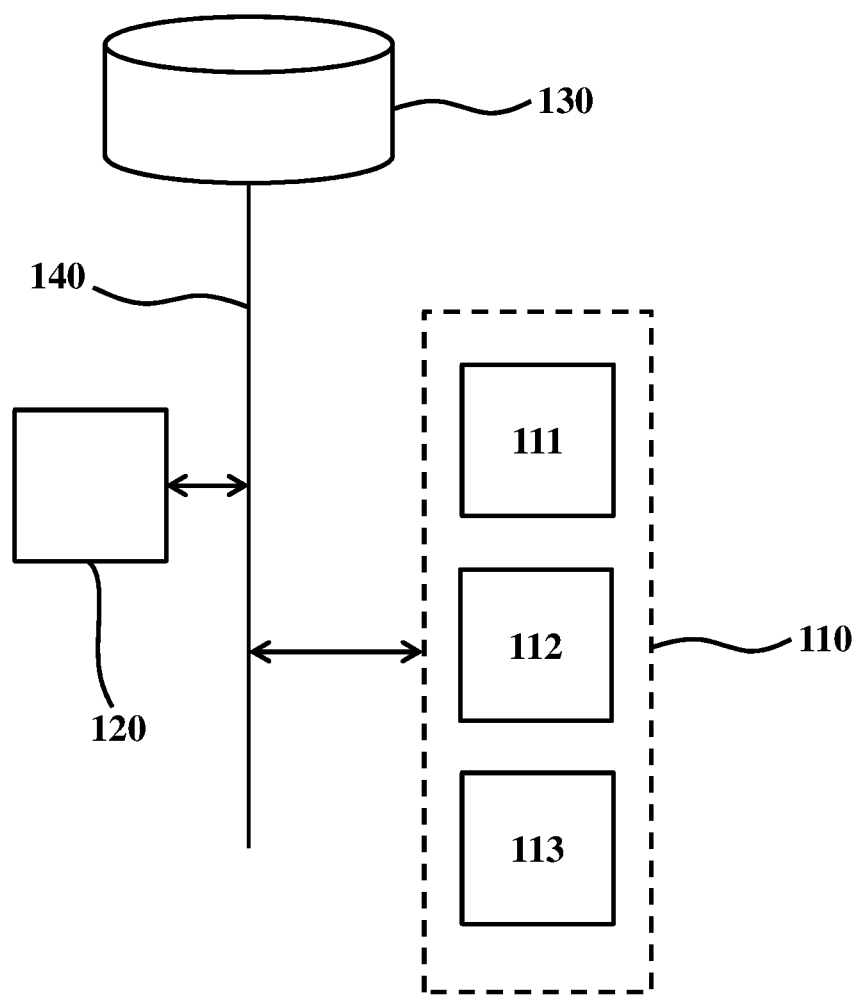
FIG. 1 schematically depicts a heterogeneous computer system, in accordance with one or more aspects of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

In the context of the present application, where reference is made to a computer program code module, this is meant to define a set of instructions for execution by the one or more processing elements of a computer system such as a heterogeneous computer system. The set of instructions for example may define a routine or subroutine of a computer program, or any other identifiable block or set of instructions within such a program.

FIG. 1 schematically depicts a heterogeneous computer system 100 according to an embodiment. The heterogeneous computer system 100 comprises a processing element architecture 110 comprising at least a first processing element 111 and a second processing element 112, in which the first processing element 111 has a different architecture to the second processing element 112.

For example, the first processing element 111 may have a hardware architecture optimized to rapidly perform parallel instructions with internal dependencies and/or to rapidly perform conditional instructions such as branch instructions. The first processing element for example may be a CPU. Any suitable type of CPU may be considered, e.g. a microprocessor contained on a single integrated circuit (IC). Such an IC may contain multiple CPUs, e.g. multiple cores, in addition to peripheral circuitry, e.g. on-chip memory, e.g. cache memory, peripheral interfaces, and so on. The CPU may employ any suitable architecture, e.g. an array or vector architecture to facilitate the parallel processing of data as is well-known.

For example, the second processing element 112 may have a hardware architecture designed for highly parallel and internally independent instructions requiring rapid manipulation and alteration of data stored in memory. The second processing element 112 for example may be a GPU. Any suitable GPU design may be contemplated. In an embodiment, the first processing element 111 may be a CPU and the second processing element 112 may be a GPU, with the GPU optionally configured as a hardware accelerator of the CPU. The CPU and the GPU may form part of different ICs or may form part of the same IC, i.e. may be located on a single die.

The processing element architecture 110 optionally may comprise one or more further processing elements 113, which may have the same architecture as one of the first processing element 111 or the second processing element 112, or may have a different architecture. The one or more further processing elements 113 may be provided on separate ICs or alternatively may share an IC with another further processing element 113 or at least one of the first processing element 111 or the second processing element 112.

The heterogeneous computer system 100 further comprises a scheduler 120 adapted to fetch computer program code modules from data storage 130 and to determine which processing element of the processing element architecture 110 is best suited for the execution of the computer program code module fetched or to be fetched. The operation of the scheduler 120 will be explained in further detail below. At this point, it is noted for the avoidance of doubt that the scheduler 120 is shown as a separate component of the heterogeneous computer system 100 by way of non-limiting example only. It is, for example, equally feasible that scheduler 120 forms part of the processing element architecture 110, for instance, forms part of one of the processing elements of the processing element architecture 110. The scheduler 120 may be a dedicated hardware component or may be implemented in software, for example, by one of the processing elements 111-113 of the processing element architecture 110.

Data storage 130 may embody one or more data storage devices, which may store computer readable program instructions which, when executed on a processor arrangement of the computer system 100 adapted to execute the computer readable program instructions, cause the processor arrangement to execute one or more embodiments of the computer-implemented methods disclosed herein. The data storage device(s) may be any suitable data storage device such as a read-only memory, a random access memory, a Flash memory, a solid state disk or disk array, an optical disc or disk array, a magnetic disk or disk array, which some of the data storage devices being connected to the computer system 100 via a data communication device 140 such as a data communications bus in case of data storage 130 physically integrated within a housing of the heterogeneous computer system 100, or via a network or cable, e.g. in the case of network-attached storage, storage area networks, cloud storage, and so on. Any suitable combination of such well-known data storage devices may form part of the data storage 130 of the heterogeneous computer system 100. In some embodiments, at least some of the data storage 130 may form part of the processing element architecture 110 and/or the scheduler 120, e.g. in the form of memory local to the processing element architecture 110, e.g. memory local to one of the processing elements 111-113, and/or in the form of memory local to scheduler 120. The processing element architecture 110 and/or the schedule 120 may be adapted to access at least part of data storage 130 over the data communication device 140. As such data communication devices are well-known per se, this will not be explained in further detail for the sake of brevity only.

In order to ensure minimized throughput times for the various computer program code modules to be executed by the processing element architecture 110, the heterogeneous computer system 100 may be adapted to implement a method 200 (FIG. 2) according to an embodiment of the present invention. The method 200 to be implemented by the heterogeneous computer system 100 has the purpose of identifying the processing element of the processing element architecture 110 that executes a particular computer program code module the quickest, i.e. ensures the shortest throughput time of the computer program module when processed by the processing element architecture 110. In accordance with one or more embodiments of the present invention, the computer-implemented method 200 may comprise a two-stage process including a first stage in which it is predicted through cyclomatic evaluation of the computer program code module which processing element of the processing element architecture 110 is most likely to execute the computer program code module the quickest. For example, in case of the first processing element 111 being a CPU and the second processing element being a GPU, a computer program code module having a high complexity may be more suited for execution by the CPU, whereas a computer program code module having a low complexity may be more suited for execution by the GPU.

Figure 2:
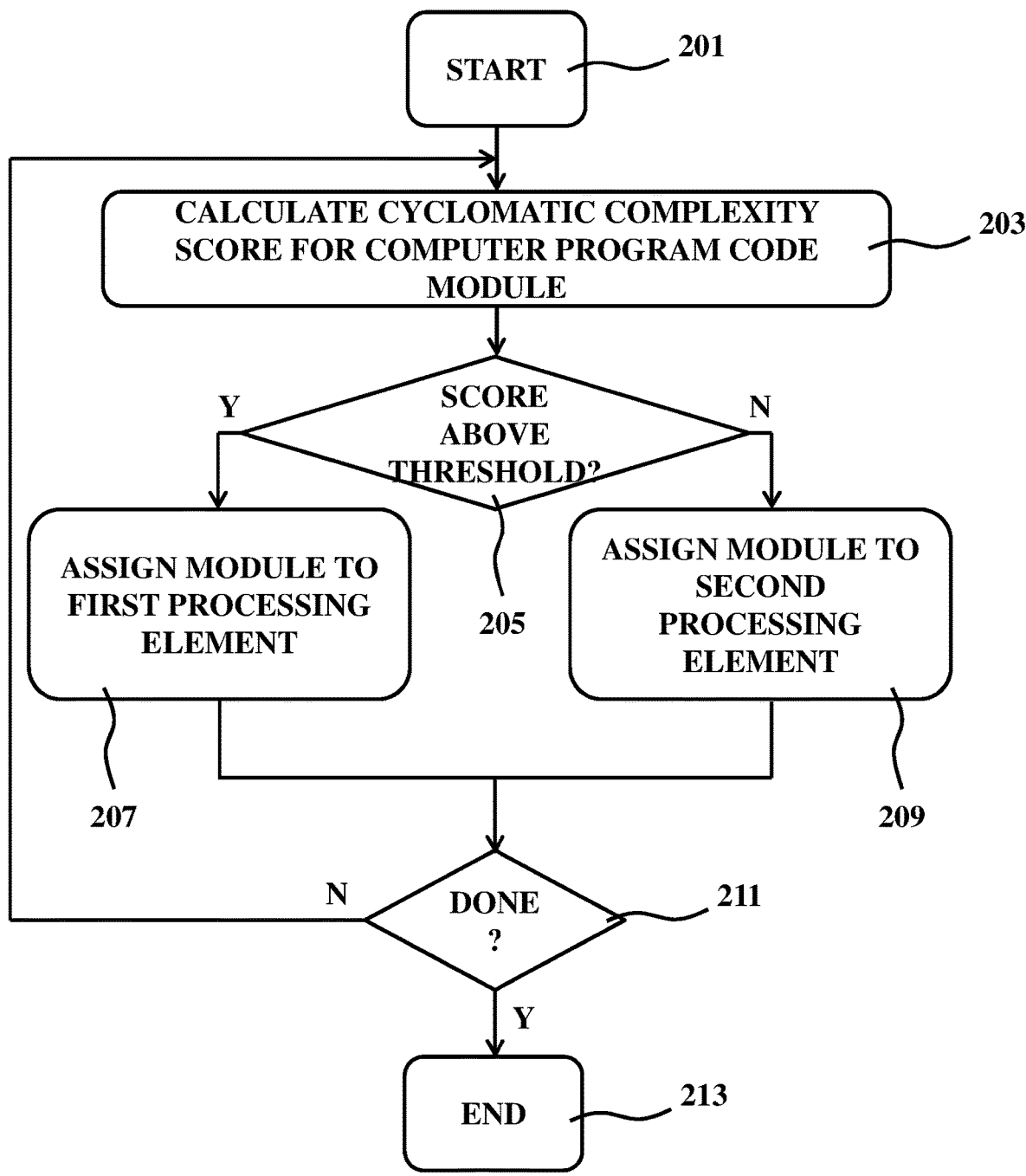
FIG. 2 is a flowchart of an aspect of a computer-implemented method, in accordance with one or more aspects of the present invention.

FIG. 2 schematically depicts a flowchart of an example embodiment of the first stage of the method 200 implemented by the heterogeneous computer system 100. In this first stage, the method 200 starts in 201, e.g. by fetching the computer program code module to be evaluated after which the method 200 proceeds to 203 in which a cyclomatic complexity score is calculated for the fetched computer program code module using a cyclomatic complexity algorithm. As is known, a cyclomatic complexity algorithm may calculate a cyclomatic complexity score for a computer program code module by identification of the number of branches within the computer program code module under evaluation.

Such a cyclomatic complexity score provides an indication of the suitability of a particular processing element, for instance, the first processing element 111 (FIG. 1) or the second processing element 112 of the processing element architecture 110, to process the computer program code module under evaluation. In the context of the present application, a particular processing element of the processing element architecture 110 is considered suitable for processing a computer program code module if the particular processing element can execute the computer program code module at least as quickly as any other processing element of the processing element architecture 110. For example, in case of the first processing element 111 comprising a CPU, the first processing element 111 may be considered a particularly suitable candidate for execution of the computer program code module under evaluation if the cyclomatic complexity score of the computer program code module is indicative of a relatively high complexity of the computer program code module. Such a relatively high complexity may be assumed if the cyclomatic complexity score of the computer program code module exceeds a defined threshold. Moreover, in case of the second processing element 112 comprising a GPU, the second processing element 112 may be considered a particularly suitable candidate for execution of the computer program code module under evaluation if the cyclomatic complexity score of the computer program code module is indicative of a relatively low complexity of the computer program code module. Such a relatively low complexity may be assumed if the cyclomatic complexity score of the computer program code module does not exceed the defined threshold.

Any suitable cyclomatic complexity algorithm may be employed for this purpose. In one embodiment, the cyclomatic complexity algorithm calculates a cyclomatic complexity score for the computer program code module under evaluation based on the number of branches detected in the computer program code module under evaluation. However, more refined cyclomatic complexity algorithms may be employed, such as algorithms in which the cyclomatic complexity score for the computer program code module under evaluation is calculated based on the number of branches and the branch depth of each of the branches within the computer program code module. This has the advantage of potentially producing a more accurate prediction of which of the processing elements of the processing element architecture 110 is most likely to be best suited to the execution of the computer program code module under evaluation. For example, a computer program code module comprising a relatively large number of branches with each branch comprising only a few instructions may be less complex than a computer program code module comprising fewer branches that each include a large number of instructions to be executed. An example embodiment of such a cyclomatic complexity score produced by such a more refined cyclomatic complexity algorithm may at least be partially based on a product of the maximum branch depth and number of branches in the computer program code module under evaluation although other suitable embodiments of such more refined cyclomatic complexity algorithms will be apparent to the skilled person.

After determining the cyclomatic complexity score of the computer program code module under evaluation, the method 200 proceeds to 205 in which the calculated cyclomatic complexity score is evaluated in any suitable manner, for example by comparing the calculated cyclomatic complexity score against a defined threshold as previously explained. In this manner, the processing element of the processing element architecture 110 (FIG. 1) is identified that is most likely to be best suited to the execution of the computer program code module under evaluation. For example, in case of the first processing element 111 being particularly suited to execute computer program code modules having a relatively high complexity, i.e. having a high cyclomatic complexity score and the second processing element 112 being particularly suited to execute computer program code modules having a relatively low complexity, i.e. having a low cyclomatic complexity score, the method 200 (FIG. 2) may identify the first processing element 111 (FIG. 1) as the processing element most likely to be best suited to the execution of the computer program code module under evaluation in case of a high cyclomatic complexity score and proceed to 207 (FIG. 2) in which the execution of the computer program code module under evaluation is provisionally assigned to the first processing element 111 (FIG. 1). Alternatively, the method 200 (FIG. 2) may identify the second processing element 112 (FIG. 1) as the processing element most likely to be best suited to the execution of the computer program code module under evaluation in case of a low cyclomatic complexity score and proceed to 209 (FIG. 2) in which the execution of the computer program code module under evaluation is provisionally assigned to the second processing element 112 (FIG. 1).

After such a provisional assignment of the execution of the computer program code module under evaluation to one of the processing elements of the processing element architecture 110 of the heterogeneous computer system 100, the method 200 (FIG. 2) may proceed to 211 in which it is checked if a further computer program code module should be evaluated. If this is the case, the first stage of the method 200 may revert back to 203 after fetching the further computer program code module to be evaluated. Otherwise, the first stage of the method 200 may terminate in 213. In an alternative embodiment, the checking in 211 may be skipped and the first stage of the method 200 may terminate in 213 after the provisional assignment of the execution of the computer program code module on the evaluation to one of the processing elements of the processing element architecture 110 (FIG. 1).

The method 200 of FIG. 2 subsequently may proceed to its second stage in which the provisional assignment of the execution of the computer program code module on the evaluation to a particular processing element of the processing element architecture 110 (FIG. 1) is validated by first executing the program code module on the processing element of the processing element architecture 110 to which the computer program code module under evaluation has been provisionally assigned and by subsequently executing the program code module on the processing element(s) of the processing element architecture 110 to which the computer program code module under evaluation has not been provisionally assigned. For example, in case of a processing element architecture 110 comprising a CPU and a GPU with the computer program code module under evaluation having been provisionally assigned to the CPU in the first stage of the method 200 (FIG. 2), the computer program code module under evaluation is first executed by the CPU followed by execution on the GPU.

Figure 3:
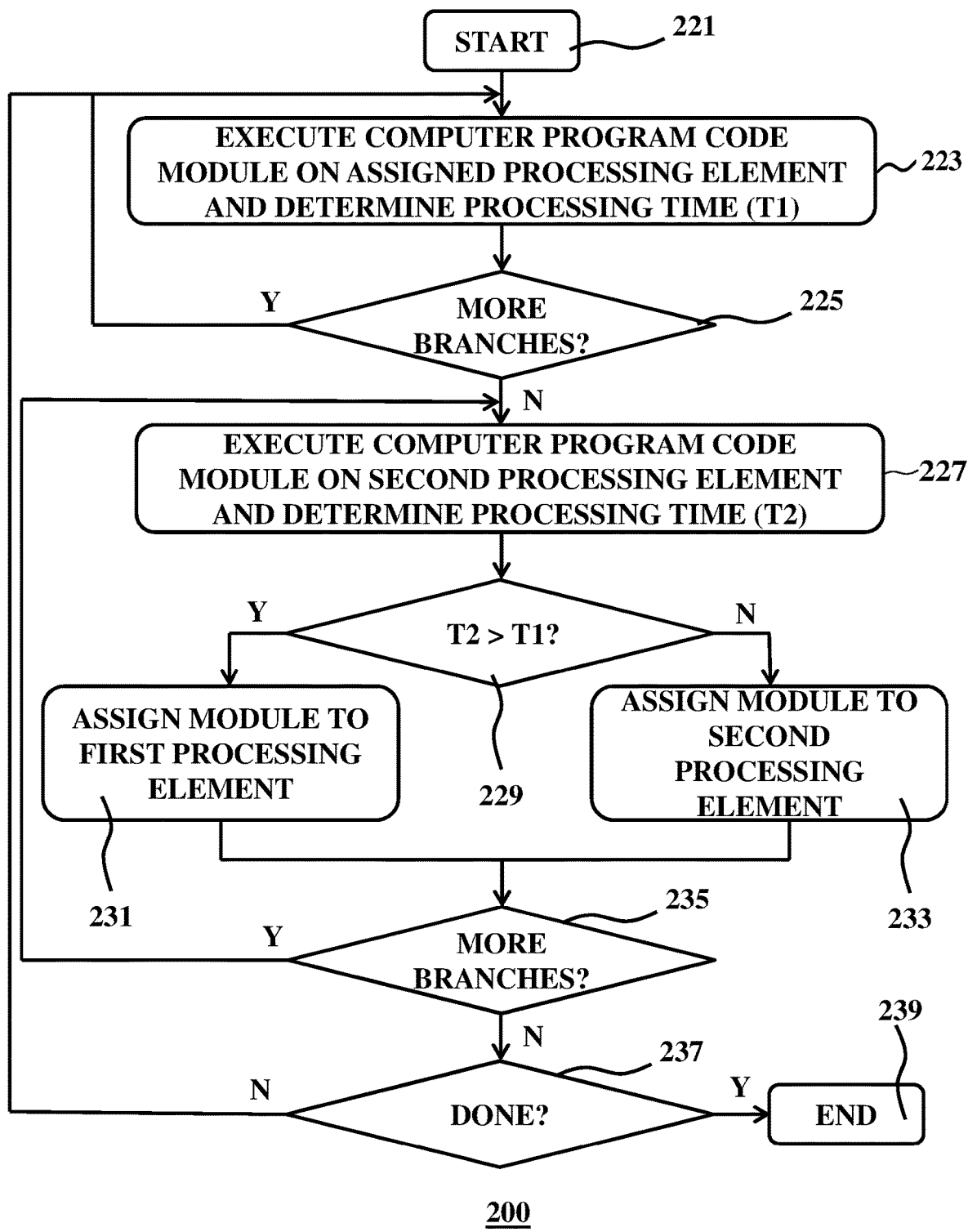
FIG. 3 is a flowchart of another aspect of a computer-implemented method, in accordance with one or more aspects of the present invention.

The second stage of the method 200 is explained in further detail with the aid of the flowchart depicted in FIG. 3. The second stage of the method 200 starts in 221 in which the computer program code module under evaluation is loaded onto the processing element to which it is provisionally assigned in 207 or 209 of the first stage of the method 200, e.g. the first processing element 111 (FIG. 1) or the second processing element 112. Next, a branch of the computer program code module under evaluation is executed on this processing element and the processing time T1, i.e. the time it takes to complete the execution of this branch of the computer program code on the assigned processing element, is determined in 223 (FIG. 3). This may be achieved in any suitable manner, e.g. using a clock or timer integral to the heterogeneous computer system 100 (FIG. 1), as is well known per se. Next it is checked in 225 (FIG. 3) if the computer program code module under evaluation comprises further branches to be evaluated. If this is the case, the method 200 reverts back to 223 in which the next branch of the computer program code module under evaluation is executed and its execution time determined. Otherwise, the method proceeds to 227.

In 227, the computer program code module under evaluation is loaded on a further processing element of the processing element architecture 110 (FIG. 1) to which the computer program code module under evaluation was not provisionally assigned during the first stage of the method 200 (FIG. 2), i.e. a processing element considered not best suited for the execution of the computer program code module under evaluation based on the cyclomatic complexity score calculated for the computer program code module under evaluation, and a branch of the computer program code module under evaluation previously executed in 223 (FIG. 3) is subsequently executed on this further processing element and the processing time T2 of this branch on this further processing element is determined as previously explained.

In one embodiment, the processing time T2 may be monitored in 229 during runtime, i.e. during execution of the branch on the further processing element and compared against the previously determined processing time T1 of the processing of the branch of the computer program code module under evaluation in 223 by the provisionally assigned processing element in the first stage of the method 200 (FIG. 2) as previously explained. As soon as the processing time T2 at least matches or exceeds the processing time T1, the execution of the computer program code module under evaluation on the further processing element may be terminated as it has been determined by runtime experiment that the processing element provisionally assigned to execute the computer program code module under evaluation based on the cyclomatic complexity score calculated in the first stage of the method 200 is indeed the processing element that is capable of the quickest execution of the branch of the computer program code module under evaluation. In this scenario, the method 200 may proceed to 231 (FIG. 3) in which the execution of the (branch of the) computer program code module under evaluation is permanently assigned to this processing element. This may include the generation or updating of a hash map in which an identifier of the computer program code module under evaluation, e.g. a function name, module name, module address, and so on, is linked to the assigned processing element such that during subsequent execution of the computer program code module under evaluation, the scheduler 120 (FIG. 1) may investigate the hash map to determine if a computer program code module to be executed has been previously evaluated by the method 200 (FIG. 3), such that the scheduler 120 (FIG. 1) may assign a thus identified computer program code module to the appropriate processing element of the processing element arrangement 110, e.g. a CPU or GPU. Such a created or updated hash map may be stored in any suitable location within data storage 130, e.g. a memory accessible to the scheduler 120.

Alternatively, if it is determined during runtime that the execution of the branch of the computer program code module under evaluation is terminated more quickly on the further processing element, i.e. T2<T1, the method 200 (FIG. 3) may proceed to 233 in which the execution of the computer program code module under evaluation is permanently assigned to the further processing element and the hash map created or updated accordingly. It should be understood that the latter scenario is substantially less likely to occur then the former scenario due to the fact that the suitability prediction provided in the first stage of the method 200 (FIG. 2) by the calculation of the cyclomatic complexity score of the computer program code module under evaluation such that in this embodiment a particularly efficient determination of the best suited processing element within the processing element arrangement 110 (FIG. 1) for execution of the computer program code module under evaluation is achieved due to the fact that in the vast majority of computer program code modules evaluated by the method 200, the evaluation time is approximately limited to $2*T_{min}+T_{cal}$, in which $T_{min}$ is the shortest execution time of the computer program code module under evaluation on a processing element of the processing element architecture 110 (FIG. 1) and $T_{cal}$ is the total duration of the first stage of the method 200 (FIG. 2).

This therefore provides a substantial improvement over methods in which the runtime behavior of a computer program code module under evaluation is evaluated by random selection of a first processing element to run the computer program code module under evaluation on, which typically leads to a waste of computational resource for about 50% of all computer program code modules evaluated in this manner as approximately half the computer program modules will be first run on a processing element for which it is subsequently determined that this processing element does not produce the shortest execution time of the computer program code module under evaluation.

The second stage of the method 200 (FIG. 3) may optionally proceed to 235 in which it may be decided if further branches of the computer program code module under evaluation needs to be executed on the further processing element. If this is the case, then the method 200 may revert back to 227 for execution of a further branch of the computer program code module under evaluation on the further processing element. Otherwise, the method 200 may proceed to 237 in which it is checked if further computer program code modules require further evaluation. If this is the case, then the method 200 may revert back to 223 in which the further computer program code module is loaded onto and executed by the processing element provisionally assigned to the further computer program code module under evaluation during the first stage of the method 200 as previously explained. Otherwise, the method 200 may terminate in 239.

At this point, it is noted that the method 200 may be implemented by the heterogeneous computer system 100 (FIG. 1) in any suitable manner. For example, one or more processing elements of the processing element architecture 110 may be adapted to execute computer readable program instructions that cause the one or more processing elements of the processing element architecture 110 to implement the various stages of the method 200 (FIGS. 2 & 3). Alternatively, the heterogeneous computer system 100 (FIG. 1) may comprise a dedicated processing element, e.g. forming part of the scheduler 120, adapted to execute computer readable program instructions that cause the dedicated processing element to implement the various stages of the method 200 (FIGS. 2 & 3). The dedicated processing element in some embodiments may form part of the processing element architecture 110 (FIG. 1) or in some other embodiments may be separate from the processing element architecture 110.

Figure 4:
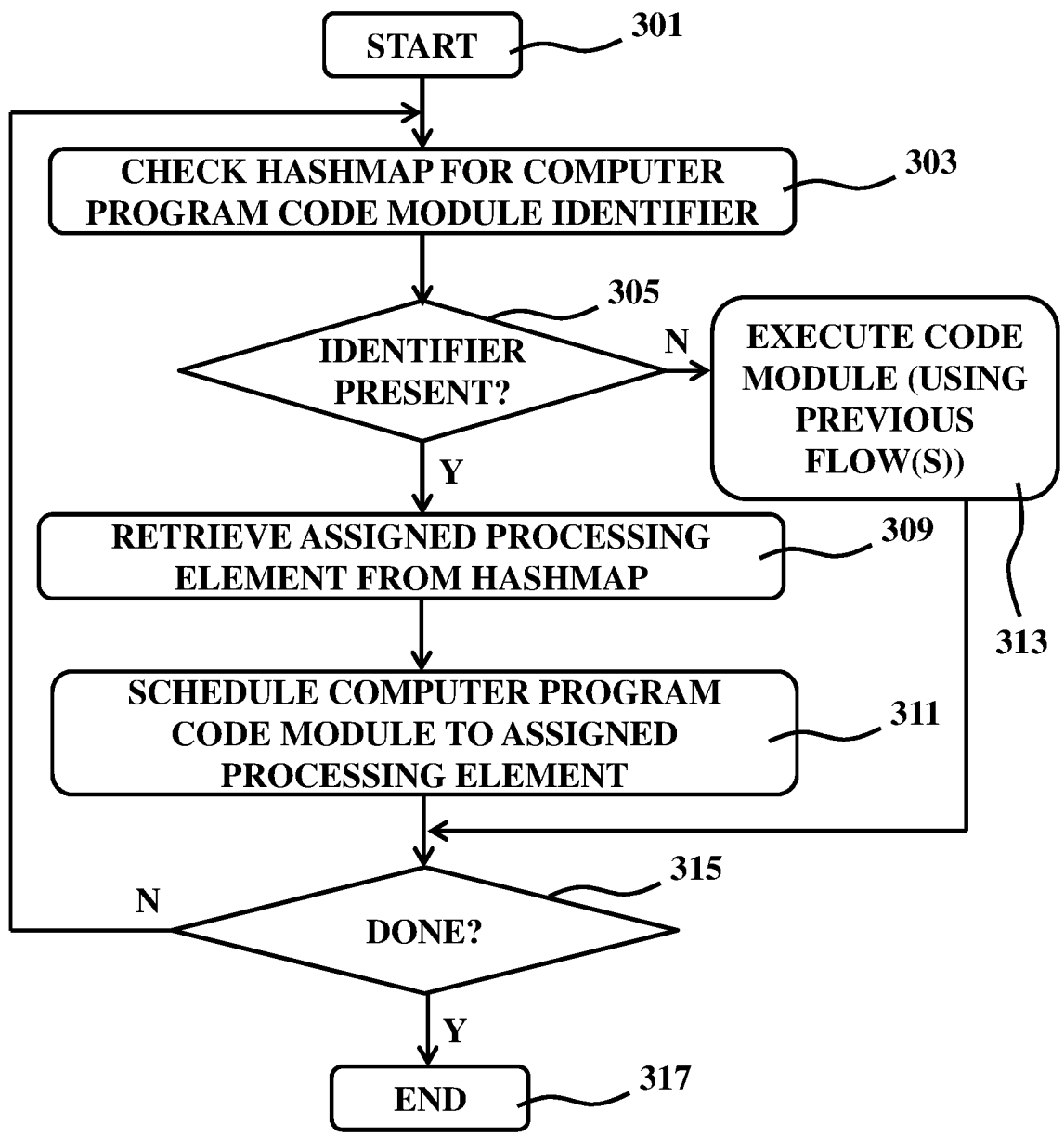
FIG. 4 is a flowchart of yet another aspect of a computer-implemented method, in accordance with one or more aspects of the present invention.

The scheduler 120 of the heterogeneous computer system 100 may be adapted to assign previously evaluated computer program code modules to a processing element of the processing element architecture 110, e.g. a first processing element 111 including a CPU or a second processing element 112 including a GPU by way of non-limiting example, using the hash map generated by the heterogeneous computer system 100 in the implementation of the method 200 as explained above. FIG. 4 schematically depicts a flowchart of a method 300 implemented by the scheduler 120 (FIG. 1) of the heterogeneous computer system 100 for managing the execution of a computer program code module by the processing element architecture 110 of the heterogeneous computer system 100. The method 300 (FIG. 3) starts in 301, for example by the scheduler receiving an instruction from the processing element architecture 110 (FIG. 1) to fetch a particular computer program code module from data storage 130 or by the scheduler being informed that the processing element architecture 110 is to execute a particular computer program code module in any other suitable manner.

Next, the method 300 (FIG. 4) proceeds to 303 in which the scheduler 120 (FIG. 1) determines the identifier of the computer program code module to be executed, e.g. determines a function name, module name, module address or the like and checks the hash map linking previously evaluated computer program code modules to permanently assigned processing elements of the processing element architecture 110 as previously explained in 305 to determine if the identifier of the computer program code module to be executed on the processing element architecture 110 is present in the hash map.

If the identifier of the computer program code module to be executed is present in the hash map, the method 300 (FIG. 4) proceeds to 309 in which the permanently assigned processing element, i.e. an identifier of this processing element, is retrieved from the hash map, upon which the method 300 proceeds to 311 in which the scheduler 120 (FIG. 1) assigns the computer program code module to be executed to the processing element associated with this computer program code module as determined from the hash map for execution on this processing element.

If the identifier of the computer program code module to be executed is not present in the hash map, the method 300 (FIG. 4) instead proceeds to 313 in which the scheduler 120 (FIG. 1) may assign the computer program code module to be executed to any of the processing elements of the processing element architecture 110 in any suitable manner, for example by assigning the computer program code module to be executed to a default processing element, e.g. a CPU, by assigning the computer program code module to be executed to a processing element having the lowest actual workload, by assigning the computer program code module to be executed to a processing element based on a previous execution flow, and so on. In an embodiment, the scheduler 120 may additionally or alternatively shortlist the unidentified computer program code module to be executed for evaluation by the method 200 (FIGS. 2 & 3) such that the hash map can be updated accordingly.

The method 300 (FIG. 4) may subsequently proceed to 315 in which it is checked if the scheduler 120 (FIG. 1) is to assign a next computer program code module to be executed to the processing element architecture 110 of the heterogeneous computer system 100. If this is the case, the method 300 (FIG. 4) may revert back to 303. Otherwise, the method 300 may terminate in 317.

Those skilled in the art will note from the above description that the present invention seeks to provide a computer-implemented method of identifying a processing element for executing a computer program code module that efficiently identifies the appropriate processing element of a heterogeneous computer system for executing a particular computer program module in an accurate manner.

The present invention further seeks to provide a computer-implemented method of managing the execution of a computer program code module on a heterogeneous computer system in which an aspect of the computer-implemented method of identifying a processing element for executing a computer program of the present invention is utilized.

The present invention further seeks to provide a computer program product comprising a computer readable storage medium having computer readable program instructions embodied therewith for, when executed on a processing arrangement of a heterogeneous computer system, causing the processing arrangement to implement the computer-implemented method of identifying a processing element for executing a computer program.

The present invention further seeks to provide a computer program product comprising a computer readable storage medium having computer readable program instructions embodied therewith for, when executed on a processing arrangement of a heterogeneous computer system, causing the processing arrangement to implement the computer-implemented method of managing the execution of a computer program code module in which an aspect of the computer-implemented method of identifying a processing element for executing a computer program of the present invention is utilized.

The present invention yet further seeks to provide a heterogeneous computer system adapted to implement the computer-implemented method of identifying a processing element for executing a computer program.

According to an aspect, there is provided a computer-implemented method of identifying a processing element for executing a computer program code module, said processing element forming part of a heterogeneous computer system comprising a first processing element having a first architecture and a second processing element having a second architecture different to the first architecture, the method comprising calculating a cyclomatic complexity score for the computer program code module; selecting one of the first processing element and the second processing element based on the calculated cyclomatic complexity score; running the computer program code module on the selected processing element to determine a first run time of the computer program code module; subsequently running the computer program code module on the non-selected processing element to determine a second run time of the computer program code module; comparing the first run time to the second runtime to identify a shortest runtime; and identifying the processing element producing the shortest runtime as the processing element for executing the computer program code module.

Advantageously, this method combines a cyclomatic analysis to predict computer program code module complexity in order to identify the most likely processing element best suited for processing the program code module with the actual evaluation of the processing time of the program code module on the first processing element and the second processing element beginning with the identified processing element most likely to be best suited for processing the program code module in order to verify if the processing element predicted to be best suited to process the program code module, e.g. in terms of throughput times, indeed exhibits the expected superior suitability compared to the other type(s) of processing element(s) of the heterogeneous computer system. In this manner, a particularly accurate identification of the best suited processing element for execution of a particular computer program module may be obtained in an efficient manner.

This is particularly the case when the method performs the comparison of the first run time to the second runtime to identify a shortest runtime during running the computer program code module on the non-selected processing element, the method further comprising terminating running the computer program code module on the non-selected processing element once the second runtime at least matches the first runtime. In this manner, the determination of the processing element best suited to process the computer program code module in terms of throughput time is kept to twice this throughput time (in addition to the time required to perform the cyclomatic evaluation of the code), thereby providing a computer-implemented method capable of determining the best suited processing element for processing the computer program code module in a particularly efficient manner.

Terminating running the computer program code module on the non-selected processing element once the second runtime at least matches the first runtime may comprise terminating running the computer program code module on the non-selected processing element once the second runtime exceeds the first runtime to ensure that one of the processing elements is better suited than the other processing element(s) to execute the computer program code under evaluation.

In one embodiment, the computer-implemented method further comprises creating a hash map by creating an association between an identifier of the computer program code module and an identifier of the identified processing element in the hash map. Such a hash map may be used during subsequent executions of the evaluated computer program code module, e.g. by a scheduler deciding which processing element to use for the execution of the computer program code module, to ensure that subsequent executions of the computer program code module may be achieved at minimal throughput without requiring evaluation of the expected suitability of the respective processing elements of the heterogeneous computer system prior to such subsequent executions of the computer program code module.

Calculating a cyclomatic complexity score for the computer program code module may comprise determining a number of branches in the computer program code module in other to assess the complexity of the computer program code module. This calculation may be extended by further calculating a branch depth for the respective branches to further refine the calculated cyclomatic complexity score.

The first processing element may be a central processing unit and the second processing element may be a graphics processing unit although it should be understood that other types of processing elements with different hardware architectures additionally or alternatively may be present in the heterogeneous computer system.

According to a further aspect, there is provided a computer-implemented method of managing the execution of a computer program code module on a heterogeneous computer system comprising a first processing element having a first architecture, a second processing element having a second architecture different to the first architecture and a data storage device comprising a hash map associating a plurality of computer program code modules with one of the first processing element and the second processing element, said hash map having been created in accordance with the aforementioned computer-implemented method, the method comprising receiving an instruction for executing a computer program code module; identifying the computer program code module in the hash map; identifying the processing element associated with the identified computer program code module in the hash map; and executing the computer program code module on the identified processing element.

Such a computer-implemented method ensures an effective management of the execution of computer program code modules on a heterogeneous computer system as it is ensured that evaluated computer program code modules are executed on the processing element best suited for the execution of the computer program code module in terms of throughput times.

The first processing element may be a central processing unit and the second processing element may be a graphics processing unit although it should be understood that other types of processing elements with different hardware architectures additionally or alternatively may be present in the heterogeneous computer system.

According to another aspect, there is provided a computer program product comprising a computer readable storage medium having computer readable program instructions embodied therewith for, when executed on a processing arrangement of a heterogeneous computer system comprising a first processing element having a first architecture and a second processing element having a second architecture different to the first architecture, the processing arrangement adapted to execute the computer readable program instructions, cause the processing arrangement to calculate a cyclomatic complexity score for the computer program code module; select one of the first processing element and the second processing element based on the calculated cyclomatic complexity score; run the computer program code module on the selected processing element to determine a first run time of the computer program code module; subsequently run the computer program code module on the non-selected processing element to determine a second run time of the computer program code module; compare the first run time to the second runtime to identify a shortest runtime; and identify the processing element producing the shortest runtime as the processing element for executing the computer program code module.

Such a computer program product may be executed by a heterogeneous computer system in order to efficiently determine which processing element is best suited to execute a particular computer program code module by implementation of the embodiments of the corresponding computer-implemented method as explained above.

According to yet another aspect, there is provided a computer program product comprising a computer readable storage medium having computer readable program instructions embodied therewith for, when executed on a processing arrangement of a heterogeneous computer system comprising a first processing element having a first architecture and a second processing element having a second architecture different to the first architecture, the processing arrangement adapted to execute the computer readable program instructions, cause the processing arrangement to receive an instruction for executing a computer program code module; identify the computer program code module in a hash map created by the processing arrangement by executing the computer readable program instructions of the above computer program code product; identify the processing element associated with the identified computer program code module in the hash map; and execute the computer program code module on the identified processing element.

Such a computer program product may be executed by a heterogeneous computer system in order to effectively select the processing element best suited to execute a particular computer program code module by implementation of the embodiments of the corresponding computer-implemented method as explained above.

According to still another aspect, there is provided a heterogeneous computer system comprising a processing arrangement including a first processing element having a first architecture and a second processing element having a second architecture different to the first architecture, the processing arrangement being adapted to calculate a cyclomatic complexity score for a computer program code module for execution by the processing arrangement; select one of the first processing element and the second processing element based on the calculated cyclomatic complexity score; run the computer program code module on the selected processing element to determine a first run time of the computer program code module; subsequently run the computer program code module on the non-selected processing element to determine a second run time of the computer program code module; compare the first run time to the second runtime to identify a shortest runtime; and identify the processing element producing the shortest runtime as the processing element for executing the computer program code module.

Such a heterogeneous computer system may be adapted to efficiently determine which processing element is best suited to execute a particular computer program code module by implementation of the embodiments of the corresponding computer-implemented method as explained above.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method comprising:
   identifying a processing element from a first processing element and a second processing element of a heterogeneous computer system for executing a computer program code module, wherein the first processing element and the second processing element comprise a processing element architecture of the heterogeneous computer system, and wherein one of the first processing element or the second processing element comprises a graphics processing unit, and wherein the identifying is based on a cyclomatic complexity score for the computer program code module and run time of the program code module when executed by the processing element, the identifying comprising:
   determining the cyclomatic complexity score for the computer program code module, wherein the determining comprises:
      detecting, by applying a cyclomatic complexity algorithm, branches in the program code comprising the computer program code module;
      based on the detecting, determining a number of the branches in the computer program code module;
      determining a depth of each of the branches within the computer program code module, wherein the determining comprises identifying a branch in the branches of the program code comprising a maximum branch depth; and
      calculating the cyclomatic complexity score based on a complexity indicated by the number of the branches and the depth of each of the branches, wherein the cyclomatic complexity score is partially based on a product of the maximum branch depth and the number of the branches; and
   selecting one of the first processing element or the second processing element based on the determined cyclomatic complexity score, the first processing element having a first hardware architecture and the second processing element having a second hardware architecture different from the first hardware architecture, the first processing element and the second processing element forming part of the heterogeneous computer system, wherein the cyclomatic complexity score either exceeds or does not meet a defined threshold and either the first processing element or the second processing element is a more suitable candidate for execution of the computer program code module, based on the cyclomatic complexity score relative to the threshold;
   scheduling the computer program code module to execute on the identified processing element, wherein the scheduling comprises:
      generating a hash map comprising an association between an identifier of the computer program code module and an identifier of the identified processing element;
      receiving an instruction to execute an application, wherein the application comprises computer program code modules including the computer program code module and at least one additional computer program code module;
determining if the hash map comprises identifiers for the computer program code modules and for each computer program code module of the computer program code modules:
based on determining that the hash map comprises an identifier for a given computer program code module, executing the computer program code module on the identified processing element at the given time; and
based on determining that the hash map does not comprise the identifier for the given computer program code module, executing the computer program code module on an available processing element of a heterogeneous computer system.

2. The computer-implemented method of claim 1, further comprising, prior to scheduling the computer program code module to execute on the identified processing element:
running the computer program code module on the selected processing element to determine a first run time of the computer program code module;
subsequently running the computer program code module on the other, non-selected processing element and monitoring a second run time of the computer program code module on the other, non-selected processing element, the subsequently running comprising early terminating running the computer program code module on the non-selected processing element before completion based on the second run time at least matching the first run time;
comparing the first run time and the second run time to identify a shortest run time; and
identifying the processing element producing the shortest run time as the processing element for executing the computer program code module, or based on the first run time and the second run time matching, identifying the processing element selected based on the determined cyclomatic complexity score as the processing element for executing the computer program code module.

3. The computer-implemented method of claim 2, wherein comparing the first run time to the second run time to identify a shortest run time is performed during running the computer program code module on the non-selected processing element.

4. The computer-implemented method of claims 1, wherein the first processing element comprises a central processing unit, and the second processing element comprises a graphics processing unit.

5. The computer-implemented method of claim 1, wherein the first processing element is a central processing unit and the second processing element is a graphics processing unit.

6. A computer program product comprising:
a computer readable storage medium having program instructions embodied therewith, the program instructions being executable by a processor to cause the processor to perform a method comprising:
identifying a processing element from a first processing element and a second processing element of a heterogeneous computer system for executing a computer program code module, wherein the first processing element and the second processing element comprise a processing element architecture of the heterogeneous computer system, and wherein one of the first processing element or the second processing element comprises a graphics processing unit, and wherein the identifying is based on a cyclomatic complexity score for the computer program code module and run time of the program code module when executed by the processing element, the identifying comprising:
determining the cyclomatic complexity score for the computer program code module, wherein the determining comprises:
detecting, by applying a cyclomatic complexity algorithm, branches in the program code comprising the computer program code module;
based on the detecting, determining a number of the branches in the computer program code module;
determining a depth of each of the branches within the computer program code module, wherein the determining comprises identifying a branch in the branches of the program code comprising a maximum branch depth; and
calculating the cyclomatic complexity score based on a complexity indicated by the number of the branches and the depth of each of the branches, wherein the cyclomatic complexity score is partially based on a product of the maximum branch depth and the number of the branches; and
selecting one of the first processing element or the second processing element based on the determined cyclomatic complexity score, the first processing element having a first hardware architecture and the second processing element having a second hardware architecture different from the first hardware architecture, the first processing element and the second processing element forming part of the heterogeneous computer system, wherein the cyclomatic complexity score either exceeds or does not meet a defined threshold and either the first processing element or the second processing element is a more suitable candidate for execution of the computer program code module, based on the cyclomatic complexity score relative to the threshold;
scheduling the computer program code module to execute on the identified processing element, wherein the scheduling comprises:
generating a hash map comprising an association between an identifier of the computer program code module and an identifier of the identified processing element;
receiving an instruction to execute an application, wherein the application comprises computer program code modules including the computer program code module and at least one additional computer program code module;
determining if the hash map comprises identifiers for the computer program code modules and for each computer program code module of the computer program code modules:
based on determining that the hash map comprises an identifier for a given computer program code module, executing the computer program code module on the identified processing element at the given time; and
based on determining that the hash map does not comprise the identifier for the given computer program code module, executing the computer program code module on an available processing element of a heterogeneous computer system.

7. The computer program product of claim 6, the method further comprising, prior to scheduling the computer program code module to execute on the identified processing element:
running the computer program code module on the selected processing element to determine a first run time of the computer program code module;
subsequently running the computer program code module on the other, non-selected processing element and monitoring a second run time of the computer program code module on the other, non-selected processing element, the subsequently running comprising early terminating running the computer program code module on the non-selected processing element before completion based on the second run time at least matching the first run time;
comparing the first run time and the second run time to identify a shortest run time; and
identifying the processing element producing the shortest run time as the processing element for executing the computer program code module, or based on the first run time and the second run time matching, identifying the processing element selected based on the determined cyclomatic complexity score as the processing element for executing the computer program code module.

8. The computer program product of claim 7, wherein the program instructions cause the processor to:
compare the first run time to the second run time to identify the shortest run time during running the computer program code module on the non-selected processing element.

9. The computer program product of claims 6, wherein the first processing element comprises a central processing unit, and the second processing element comprises a graphics processing unit.

10. The computer program product of claim 6, wherein the first processing element is a central processing unit and the second processing element is a graphics processing unit.

11. The computer program product of claim 6, wherein the computer readable program instructions cause the computer program code module to be assigned to the identified processing element for execution of the computer program code module.

12. A system comprising:
a memory; and
a processor communicatively coupled to the memory, wherein the system performs a method comprising:
identifying a processing element from a first processing element and a second processing element of a heterogeneous computer system for executing a computer program code module, wherein the first processing element and the second processing element comprise a processing element architecture of the heterogeneous computer system, and wherein one of the first processing element or the second processing element comprises a graphics processing unit, and wherein the identifying is based on a cyclomatic complexity score for the computer program code module and run time of the program code module when executed by the processing element, the identifying comprising:
determining the cyclomatic complexity score for the computer program code module, wherein the determining comprises:
detecting, by applying a cyclomatic complexity algorithm, branches in the program code comprising the computer program code module;
based on the detecting, determining a number of the branches in the computer program code module;
determining a depth of each of the branches within the computer program code module, wherein the determining comprises identifying a branch in the branches of the program code comprising a maximum branch depth; and
calculating the cyclomatic complexity score based on a complexity indicated by the number of the branches and the depth of each of the branches, wherein the cyclomatic complexity score is partially based on a product of the maximum branch depth and the number of the branches; and
selecting one of the first processing element or the second processing element based on the determined cyclomatic complexity score, the first processing element having a first hardware architecture and the second processing element having a second hardware architecture different from the first hardware architecture, the first processing element and the second processing element forming part of the heterogeneous computer system, wherein the cyclomatic complexity score either exceeds or does not meet a defined threshold and either the first processing element or the second processing element is a more suitable candidate for execution of the computer program code module, based on the cyclomatic complexity score relative to the threshold; and
scheduling the computer program code module to execute on the identified processing element, wherein the scheduling comprises:
generating a hash map comprising an association between an identifier of the computer program code module and an identifier of the identified processing element;
receiving an instruction to execute an application, wherein the application comprises computer program code modules including the computer program code module and at least one additional computer program code module;
determining if the hash map comprises identifiers for the computer program code modules and for each computer program code module of the computer program code modules:
based on determining that the hash map comprises an identifier for a given computer program code module, executing the computer program code module on the identified processing element at the given time; and
based on determining that the hash map does not comprise the identifier for the given computer program code module, executing the computer program code module on an available processing element of a heterogeneous computer system.

13. The system of claim 12, wherein the first processing element is a central processing unit and the second processing element is a graphics processing unit.

* * * * *